Figure 2:
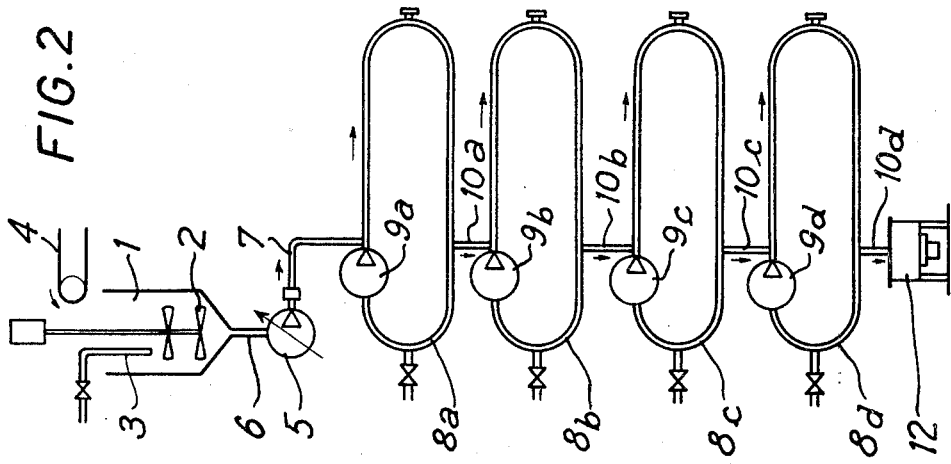

United States Patent [19]

Pollozec et al.

[11] 4,206,302

[45] Jun. 3, 1980

[54] CONTINUOUS PROCESS FOR THE NITRATION OF CELLULOSE AND APPARATUS THEREFOR

[75] Inventors: François A. Pollozec; Gontran Royer, both of Bergerac; Rémy Favrot, Pont de Buis; Michel B. Maures; André J. Mengelle, both of Bergerac, all of France

[73] Assignee: Societe Nationole des Poudres et Explosifs, Paris, France

[21] Appl. No.: 885,271

[22] Filed: Mar. 10, 1978

[30] Foreign Application Priority Data

Mar. 30, 1977 [FR] France .................. 77 09540

[51] Int. Cl.² .................. C08B 5/00; C08B 17/04
[52] U.S. Cl. .................. 536/35; 422/163; 422/189
[58] Field of Search .......... 536/35; 526/64; 23/260

[56] References Cited

U.S. PATENT DOCUMENTS

| | | | |
|---|---|---|---|
| 1,729,628 | 10/1929 | Richter et al. | 536/33 |
| 2,238,444 | 4/1941 | Fravel | 536/35 |
| 2,332,527 | 10/1943 | Pyzel | 23/260 |
| 2,678,310 | 5/1954 | Brooks | 536/35 |
| 2,927,845 | 3/1960 | Plunkett | 536/35 |
| 3,035,033 | 5/1962 | Schweitzer et al. | 526/64 |
| 3,203,766 | 8/1965 | Mudd et al. | 526/64 |
| 3,293,000 | 12/1966 | Marwil | 526/64 |

FOREIGN PATENT DOCUMENTS

| | | | |
|---|---|---|---|
| 841263 | 7/1960 | United Kingdom | 526/64 |
| 886784 | 1/1962 | United Kingdom | 526/64 |
| 301927 | 6/1971 | U.S.S.R. | 526/64 |

*Primary Examiner*—Ronald W. Griffin
*Attorney, Agent, or Firm*—Bucknam and Archer

[57] ABSTRACT

In a continuous process for the nitration of cellulose, a slurry of cellulose in nitrating liquor is injected under pressure into a primary nitration reactor by means of an injection pump, the reactor comprising a loop of tubing, the slurry is circulated in the loop by means of a circulation pump at a rate which is greater than the rate of injection in order to ensure that the slurry is vigorously agitated, the slurry is optionally transferred, successively, from the primary loop to one or more secondary nitration reactors, each of which also comprises a loop of tubing equipped with a circulation pump, and the slurry is withdrawn from the final loop and the nitrocellulose is recovered.

15 Claims, 2 Drawing Figures

CONTINUOUS PROCESS FOR THE NITRATION OF CELLULOSE AND APPARATUS THEREFOR

The present invention is concerned with a process for the continuous nitration of cellulose to produce nitrocellulose, and with apparatus for carrying out such process.

The nitration of cellulose using a nitrating liquor comprising a mixture of nitric acid, sulphuric acid and water is an exothermic equilibrium reaction which is relatively slow, principally because of its topochemical character; in fact, the rate of the nitration reaction is limited by the rate of diffusion of the nitric acid and of the water through the cellulose fibres. A nitration process which is homogeneous and of a compact nature therefore requires:

a small spread in residence times in the nitration reactor, vigorous agitation (which also favours a good reaction rate), very low losses of acid vapours, the reaction being sensitive to small variations in the composition of the liquor, good temperature control: too low a temperature retards the reaction and has a slight influence on the final state; too high a temperature increases the losses of acid vapours, and operation under a slight pressure which enables a higher proportion of nitrogen to be obtained in the product.

Known processes for the nitration of cellulose include both discontinuous and continuous processes.

In discontinuous processes, the cellulose and the nitrating liquor are introduced in batches into mixers and are stirred for the time required for the reaction to occur. Theoretically, all the parameters indicated above can be controlled except the temperature, the heat exchange surface of such mixers being relatively small.

In practice, such discontinuous apparatus operate at atmospheric pressure, with moderate stirring, and virtually in the open air, this giving rise to significant losses of acid vapours. The only favourable factor is a perfectly defined residence time.

Continuous processes are carried out either in screw reactors, or in reactors assembled in cascades, or in tubular reactors.

In screw reactors, the slurry of cellulose and nitrating liquor is moved by a screw, the speed of rotation of which determines the reaction time.

In these reactors, as in discontinuous processes, the residence time is well-defined. On the other hand, it is difficult to carry out agitation efficiently and it is virtually impossible to envisage such a process operating under pressure. Vapour losses and the temperature are difficult to control. In cascade reactors, the slurry which is being nitrated is stirred in mixers and it overflows from one to the next. The spread of the residence time decreases as the number of reactors is increased. It is theoretically possible to design an installation of this type which conforms to the conditions stated above. In practice, this is not the case and these installations are no better than screw reactors. Furthermore, regulation of the temperature always poses a problem because of the small heat exchange surface.

In tubular reactors, the material to be nitrated circulates from one end to the other of a coil. However, such a reactor can only offer one possible flow-rate and one possible residence time.

We have now developed a process for the continuous nitration of cellulose which enables the disadvantages of known process to be obviated or reduced and which is based on circulating the reaction mixture in a loop of tubing.

According to one aspect of the present invention, there is provided a process for the continuous nitration of cellulose using a nitrating liquor comprising nitric acid, sulphuric acid and water, which comprises continuously injecting slurry consisting of measured amounts of cellulose and the nitrating liquor under pressure into a primary nitration reactor comprising a loop of tubing, causing the slurry to circulate in a circuit in the loop, in the absence of air, by means of a circulation pump which forms part of the loop at a rate of circulation which is greater than the rate of injection of the slurry into the loop in order to obtain vigorous mixing of the slurry in the loop, and continuously withdrawing the slurry from the loop at a rate which is equal to the rate of injection and recovering the nitrocellulose formed from the withdrawn slurry.

In a preferred form of this process, after passing through the primary nitration reactor and before separation of the nitrocellulose therefrom, the slurry is transferred to and passed through one or more secondary nitration reactors arranged in series, each comprising a loop of tubing, the slurry being transferred to and withdrawn from the or each secondary nitration reactor at a rate of transfer which is equal to the rate of injection into the primary nitration reactor and being circulated in the loop of the or each secondary nitration reactor, in the absence of air, by means of a circulation pump forming part of the loop thereof at a rate which is greater than the rate of injection of the slurry in order to obtain vigorous mixing of the slurry in the loop.

In carrying out the process, an injection pump is preferably used to feed the slurry under pressure into the primary nitration loop and, where there are secondary nitration loop(s), to transfer the slurry from the primary loop to the secondary nitration loop(s) in turn by means of the excess pressure generated by the injection pump. The pressure generated by the injection pump defines the residence time of the slurry in the nitration installation.

The injection pump must overcome the pressure losses in the injection pipes and the transfer pipes between the nitration loops, and the sum of the pressure heads produced by the circulation pumps.

The point at which the injection pump operates is situated at the intersection of the curve representing the operating characteristics of the pump with the curve representing the total pressure head which is to be produced by the injection pump, and is a function of the rate of injection. A pump must therefore be used which produces a small flow-rate under the greatest possible pressure head and which is capable of providing a variable flow-rate so that the residence time of the slurry in the installation can be varied.

Volumetric pumps which give a controllable flow-rate under a virtually indeterminate pressure head are able to meet these criteria. However, with this type of pump, small variations in flow-rate correspond to large variations in the injection pressure, which could give rise to a serious danger of explosion when manufacturing nitrocellulose, if the installation were accidentally blocked.

It is therefore preferred, for reasons of safety, to use a centrifugal pump for this purpose. With such pumps there is a large variation in the flow-rate for a small variation in the pressure head, which eliminates the dangers of explosion in the case of an accidental blockage.

In order to vary the rate of injection so as to change the residence time in the installation, a speed variator can be provided at the inlet to the centrifugal pump.

The slurry is circulated inside each nitration loop at a rate which is greater, preferably considerably greater, than the rate of injection, and this acceleration is provided by the circulation pump which effects vigorous agitation. The circulation pumps enable the Reynolds number in the nitration loops to be kept at an adequate value, even at the lowest rates of injection.

The circulation pumps should therefore be capable of imparting to the slurry as high a rate of circulation in the loops as possible, relative to the rate of injection, and of overcoming the pressure losses in the loops. Circulation pumps should therefore be used which produce a high flow-rate under a small pressure head.

Centrifugal pumps are suitable for this purpose. By providing such pumps with a speed variator, the danger of blockage of the installation when the rate of injection becomes too low can be avoided.

According to the layout, several possible arrangements can be chosen for each nitration loop, it being possible for the loops to assist or work against the injection pump or, on the other hand, to be neutral, depending on whether the pipes for the injection and withdrawal of the slurry are on either side of the circulation pump of each nitration loop or, on the other hand, whether they are close together and on the same side of the circulation pump.

One or other arrangement is selected depending on whether it is desired to assemble the plant vertically (when the available ground space is limited) or whether it is desired to assemble the plant at ground level (when the available ground space is unlimited).

As regards the operating parameters, and more particularly the duration of the nitration reaction, the nominal proportion of nitrogen in the nitrocelluloses is reached after the slurry has been in the installation for 7 minutes for a nitrocellulose containing an average proportion of nitrogen, and for 8 minutes for a nitrocellulose containing a high proportion of nitrogen.

The influence of the reaction temperature on the final proportion of nitrogen is small, but it has a significant effect on the rate of nitration. A reaction temperature of up to 43° C. gives good results.

As regards concentration, the slurry cannot be transported at any concentration since if the concentration is too high, there is a risk of blockages in the installation. It is preferred to use a cellulose concentration of 30 g/liter, which corresponds to a nitration ratio of 50 to 60.

The process according to the invention, which may be briefly referred to as "loop nitration", has numerous advantages:

It is a continuous process which is more rapid than conventional nitration processes.

There is no atmosphere/nitrating liquid interface and the emission of nitrous vapours is therefore prevented so that the nitration is more efficient and nitration liquor consumption is reduced.

Circulation of the slurry at high speed inside the loops brings about good agitation and mixing and the use of loops enables the length of the installation to be reduced. (The consequent differences in residence time become very small beyond four to five loops).

The process according to the invention should also result in a safer installation.

The installation is quite simple and the operating costs are lower than those required for conventional continuous nitration processes.

The experiments described below show that the process according to the invention can be used to make conventional types of nitrocellulose containing an average or a high proportion of nitrogen. The process can, in principle, be used to make all types of nitrocellulose; the only restriction on the use of the process is the concentration of the slurry. In general, this concentration should not exceed 50 g/liter. There are also lower limits for the diameter of the tubing and for the rate of transfer of the slurry; it is not possible to drop much below 0.7 m/second for the rate of injection and transfer and much below 80 mm for the diameter of the tubing. As a result, the rate of injection should be at least about 30 $m^3$/hour and the rate of circulation should be as high as possible (for example 120 $m^3$/hour) in order to improve agitation and mixing. In practice, it is not possible to attain violently turbulent conditions.

In fact, loop nitration enables more precise and higher proportions of nitrogen to be obtained in the product, and most importantly, enables the consumption of nitric acid to be reduced, the consumption in the case of nitrocelluloses containing an average proportion of nitrogen being the conventional consumption divided by 1.2.

The duration of nitration is much shorter than with a nitration at atmospheric pressure; it is decreased by half (10 minutes compared with 20 minutes in the conventional systems).

According to a further aspect of the invention, there is provided nitration apparatus which comprises a primary nitration reactor comprising a loop of tubing, an injection pump for feeding a slurry of cellulose in nitrating liquor into the loop under pressure, a circulation pump which forms part of the loop and which is adapted to produce a flow rate in the loop which is greater than the rate of injection of the slurry into the loop, and an outlet pipe for the withdrawal of slurry from the loop.

In a preferred embodiment of this apparatus, the outlet pipe from the primary nitration loop is connected to one or more secondary nitration reactors arranged in series, each comprising a loop of tubing and a circulation pump which forms part of the loop and which is adapted to produce a flow rate in the loop which is greater than the rate of injection of the slurry into the primary nitration loop, and an outlet pipe for the withdrawal of slurry from the loop.

The present invention also comprises an installation for the continuous nitration of cellulose, which comprises an impregnator equipped with a stirrer, an inlet for nitrating liquor and means for supplying cellulose to the impregnator, and means for supplying the slurry from the impregnator to the injection pump of an apparatus according to the invention.

Figure 1:
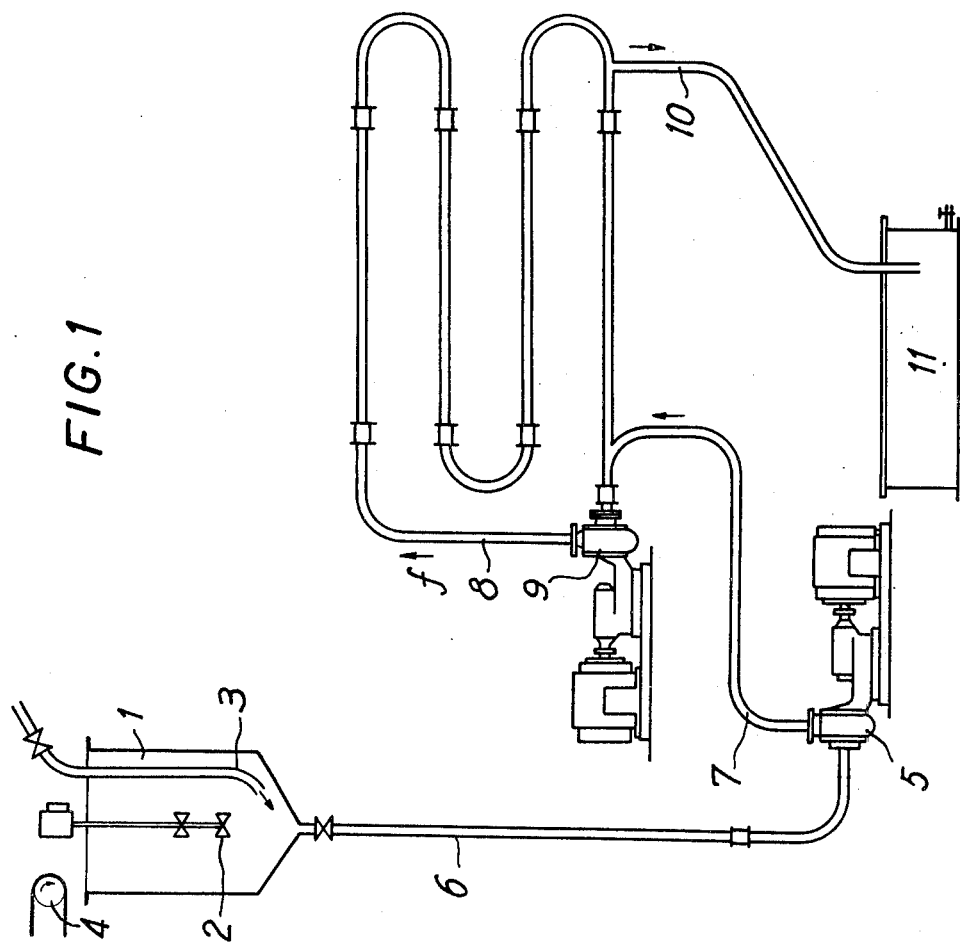

In order that the invention may be more fully understood, preferred embodiments thereof will now be described, by way of example, with reference to the accompanying drawings, in which:

FIG. 1 is a schematic representation of a loop nitration installation according to the invention which comprises a single nitration loop, and FIG. 2 is a schematic representation of a loop nitration installation comprising several nitration loops.

The installation shown in FIG. 1 comprises an impregnator 1 equipped with a stirrer 2, which is supplied with nitrating liquor through a dip-tube 3 and with cellulose by a conveyor belt 4, and in which the cellulose and the nitrating liquor, which are supplied in measured amounts, are mixed in order to form a slurry. An injector pump 5, which is advantageously a centrifugal pump provided with a speed variator, transfers the slurry, via pipes 6 and 7, to a nitration reactor in the form of a loop of tubing 8. A circulation pump 9, which is also advantageously a centrifugal pump provided with a speed variator, is included in the loop 8 slightly downstream from the point at which the loop is joined to the pipe 7. After complete nitration, the slurry is withdrawn from the loop 8 through a withdrawal pipe 10, at a point which is situated upstream from the point at which the loop is joined to the pipe 7; the withdrawn slurry is passed to a collecting tank 11.

This assembly, in which the injection and withdrawal of the slurry are on the same side of the circulation pump, is said to be an assembly having a neutral loop with a slight pumping action. This type of loop is suitable for installations erected at ground level and saves injection power.

In operation, the nitrocellulose and the nitrating liquor are mixed in the impregnator 1 and the slurry thus prepared is injected under pressure into the nitration loop 8 by means of the injector pump 5. Inside the loop, the slurry circulates in the direction of the arrow f, at a rate which is substantially greater than the injection rate (of the pump 5) due to the action of the circulation pump 9, the flow-rate of which is chosen so as to be considerably greater than that of the injector pump 5 so that the slurry is vigorously agitated.

By means of the excess pressure which it generates, the injector pump 5 ensures the withdrawal of the nitrated cellulose from the loop 8 at a rate of withdrawal which is equal to the rate of injection of the slurry into the loop 8. The flow-rate of the injector pump therefore defines the residence time of the slurry in the nitration loop.

The nitrated cellulose which is withdrawn is discharged into the collecting tank 11 and can be collected in a continuous drier (not shown).

The installation shown in FIG. 2 comprises four nitration loops 8a, 8b, 8c and 8d, which are arranged vertically and joined together in series by connecting pipes 10a, 10b and 10c, the pipe 10d being used for the withdrawal of the nitrated cellulose from the final loop.

Each nitration loop is provided with a circulation pump 9a, 9b, 9c and 9d, of the centrifugal pump type, which is provided with a speed variator and has a flow-rate which is considerably greater than that of the injector pump 5. As shown in the drawing, the injection pipe 7 joins the injector pump 5 to the first nitration loop 8a at a point on this loop which is situated slightly downstream from the circulating pump 9a, whilst the connecting pipe 10a joins the first loop 8a (at a point which is situated upstream from the circulating pump 9a, the pipes 7 and 10a thus being on either side of pump 9a) to the second loop 8b (at a point which is situated slightly downstream from the circulating pump 9c) and so on; the withdrawal pipe 10d removes the nitrated cellulose from the final nitration loop 8d into a continuous drier 12.

The assembly thus described, in which the injection and withdrawal of the slurry are on either side of the circulation pump, is of the kind having loops with a restraining action. Loops of this kind enable the installation to be erected vertically when the available ground space is limited.

In operation, the slurry of cellulose and nitrating liquor, which is prepared in the impregnator 1, is injected under pressure into the first nitration loop 8a by the injector pump 5. Inside the loop, the slurry is circulated in the direction of the arrow at a high speed relative to the injection rate by the action of the circulation pump 9a which ensures that the slurry is vigorously agitated. Owing to the excess pressure which it generates, the injector pump 5 transfers the slurry from the first loop 8a to the second loop 8b, via the connecting pipe 10a, at a flow-rate which is equal to the rate of injection, and so on, the circulation pump in each nitration loop ensuring that the slurry is vigorously agitated in each loop, whilst the injector pump transfers the slurry from one loop to the next.

Finally, the nitrated cellulose is removed from the final loop 8d and collected in a continuous drier 12.

The conditions used for the nitration of cellulose in the installations described above are as follows:
diameter of the pipes (forming the nitration loops and the pipes for connecting the loops): at least 80 mm;
Reynolds number: about 50,000;
number of loops: at least one loop and, preferably, 4 or 5 loops (the spread in the residence times is reduced by increasing the number of loops, the difference in residence times becoming very small with more than 4 or 5 loops; furthermore, the nitration is complete after 4 or 5 loops—above this number, no improvement in the result is obtained);
flow-rate of the injector pump: 18 to 35 m$^3$/hour;
flow-rate of the circulation pumps: as high as possible, for example about 120 m$^3$/hour;
ratio of rate of circulation/rate of injection: 3.4 to 6.7;
speed of circulation of the slurry: about 4.2 m/second;
speed of transfer of the slurry: 0.63 to 1.23 m/second;
excess pressure generated by the injection pump: 1.5 to 3 bars;
residence time of the slurry in the installation: 6 to 12 minutes;
nitration temperature: up to 43° C.; and
concentration of the slurry: up to 30 g of cellulose per liter of nitrating liquor (corresponding to a nitration ratio of 50 to 60).

The following examples of the process according to the invention are given by way of illustration only.

EXAMPLE 1

A nitration installation as shown in FIG. 2 and designed for the production of 25 tonnes of nitrocellulose per day, had the following characteristics:
4 nitration loops comprising pipes of 100 mm diameter and 80 m total length, which are joined together by pipes of 100 mm diameter and 30 m total length;
Reynolds number: 50,000;
4 circulation pumps: flow-rate of 120 m$^3$/hour;
assembly of the 4 loops on 4 levels (so as to compensate the total pressure head of the circulation pumps of 35 m with a geometrical height of 10 m);
injection pump (placed at the 4th level): rate of injection 20 m$^3$/hour (for the delivery height of 25 m, taking account of the above and of the pressure losses in the connection tubes);
excess pressure generated by the injection pump: 1.8 bars (between the inlet and outlet of each circulation pump);
ratio of rate of circulation/rate of injection: 6;
speed of circulation of the slurry inside the loops: 4.2 m/second; and
speed of transfer of the slurry from one loop to the next: 0.7 m/second.

The slurry was prepared from cellulose and a conventional nitrating liquor of the following composition:

|  | Parts by weight |
|---|---|
| $H_2SO_4$ | 60.64 |
| $HNO_3$ | 22.24 |
| $H_2O$ | 16.05 |
| $NO_2$ | 1.07 | and had a concentration of 30 g of cellulose per liter of nitrating liquor.

The nitration temperature was 30° C. A proportion of nitrogen of 12.5% was reached after a residence time of the slurry in the nitration installation of only 7 minutes.

Under these conditions, a nitrocellulose having the following characteristics was obtained:
proportion of nitrogen: 12.5%
stability at 134.5°: 30 minutes
Viscosity: 83 centipoises (2% solution in ethyl acetate)
Taliani value: 103 minutes
solubility in 56% ether: 99%
solubility in 95% alcohol: 2.14%
materials insoluble in acetone: 0.36%
alkalinity: 0.14%
fineness: 100 cm$^3$
(volume occupied by 10 g of nitrocellulose after settling in 250 cm$^3$ of water for 2 hours).

EXAMPLE 2

The nitration installation described in Example 1 was operated under the same conditions, but using a slurry having a concentration of 30 g of cellulose per liter of a conventional nitrating liquor of the following composition:

|  | Parts by weight |
|---|---|
| $H_2SO_4$ | 66.13 |
| $HNO_3$ | 22.83 |
| $H_2O$ | 10.38 |
| $NO_2$ | 0.656 |

A nitrogen proportion of 13.5% was obtained in the product with a residence time of only 8 minutes. The characteristics of the product were as follows:
proportion of nitrogen: 13.5%
stability at 134.5°: 30 minutes
viscosity: 195 centipoises (4% solution in ethyl acetate)
Taliani value: 77.5 minutes
solubility in 56% ether: 9%
solubility in 95% alcohol: 3.6%
materials insoluble in acetone: 0.3%
alkalinity (to $CO_3Ca$) <0.2%
fineness: 100 cm$^3$ By way of comparison, with a conventional tubular nitration reactor, it would be necessary to use a tubular reactor having a prohibitive tube length of 2100 m for a tube diameter of 100 mm, if it were desired to maintain the same hydraulic operating conditions in such a reactor as in the nitration loops according to the invention (that is to say, the same intensity of agitation of the slurry, or the same Reynolds number) for a flow-rate of 120 m$^3$/hour (equal to the rate of circulation in the loops according to the invention).

On the other hand, if it were desired to maintain a flow-rate of 20 m$^3$/hour in such a conventional tubular reactor (equal to the rate of injection or to the rate of transfer of the slurry from one loop to the next, according to the invention), it would be necessary to use 380 m of a 100 mm diameter tube in order to attain a Reynolds number of only 8,000, which is very much lower than the Reynolds number of 50,000 reached in the nitration loops according to the invention; in this case, since the degree of agitation is too low, the cellulose fibres would be poorly nitrated and there would be a large spread in the residence times.

EXAMPLE 3

A nitration installation as shown in FIG. 1 had the following characteristics:
1 nitration loop comprising a pipe of 80 mm diameter and 60 meters total length, which was joined, upstream and downstream, by pipes of 80 mm diameter and of 10 meters total length;
Reynolds number: 50,000;
1 circulation pump: flow-rate 120 m$^3$/hour;
1 injection pump: flow-rate 20 m$^3$/hour;
excess pressure generated by the injection pump: 1.5 to 2 bars;
ratio of rate of circulation/rate of injection: 6;
speed of circulation of the slurry inside the loop: 6 m/second; and
speed of injection of the slurry: 1 m/second.

The slurry was prepared from cellulose and a nitrating liquor of the following composition:

|  | Parts by weight |
|---|---|
| $H_2SO_4$ | 60.30 |
| $HNO_3$ | 22.78 |
| $H_2O$ | 16.04 |
| $NO_2$ | 0.88 | and had a concentration of 20 g of cellulose per liter of nitrating liquor.

The nitration temperature was 32° C. A proportion of nitrogen of 12.49% was reached after a residence time of the slurry in the installation of 6 minutes.

Under these conditions, a nitrocellulose having the following characteristics was obtained:
proportion of nitrogen: 12.49%
stability at 134.5°: >30 minutes
viscosity: 83 centipoises (2% solution in ethyl acetate)
Tiliani value: 104 minutes
solubility in 56% ether: >99%
solubility in 95% alcohol: 2%
alkalinity (to $CO_3Ca$): 0.2%
materials insoluble in acetone: 0.36%
fineness: 100 cm$^3$.

What is claimed is:
1. A process for the continuous nitration of cellulose using a nitrating liquor comprising nitric acid, sulphuric acid and water, which comprises the steps of:
(i) continuously injecting a slurry consisting of measured amounts of cellulose and the nitrating liquor under pressure into a primary nitration reactor comprising a loop of tubing, (ii) causing the slurry to circulate in a circuit in the loop, in the absence of air, by means of a circulation pump which forms part of the loop at a rate of circulation which is greater than the rate of injection of the slurry into the loop in order to obtain vigorous mixing of the slurry in the loop, and (iii) continuously withdrawing the slurry from the loop at a rate which is equal to the rate of injection and recovering the nitrocellulose formed from the withdrawn slurry.

2. A process as set forth in claim 1, wherein, after passing through the primary nitration reactor and before separation of the nitrocellulose therefrom, the slurry is transferred to and passed through at least one secondary nitration reactor arranged in series, each comprising a loop of tubing, the slurry being transferred to and withdrawn from each secondary nitration reactor at a rate of transfer which is equal to the rate of injection into the primary nitration reactor and being circulated in the loop of each secondary nitration reactor, in the absence of air, by means of a circulation pump forming part of the loop thereof at a rate which is greater than the rate of injection of the slurry in order to obtain vigorous mixing of the slurry in the loop.

3. A process as set forth in claim 2, wherein the primary nitration loop and the secondary nitration loops are arranged in vertically descending series.

4. A process as set forth in claim 1, wherein, in each nitration loop, the point of injection of the slurry and the point of withdrawal of the slurry are on either side of the circulation pump.

5. A process as set forth in claim 1, wherein, in each nitration loop, the point of injection of the slurry and the point of withdrawal of the slurry are close together and on the same side of the circulation pump.

6. A process as set forth in claim 1, wherein:
the internal diameter of the tubing forming the nitration loops is at least 80 mm,
the rate of circulation of the slurry in the nitration loops is about 120 m³/hour,
the ratio of the rate of the circulation to the rate of injection of the slurry is from 3.4 to 6.7,
the excess pressure applied to the slurry between the inlet and outlet of each circulation pump is from 1.5 and 3 bars, and
the Reynolds number of the slurry circulating in the nitration loops is about 50000.

7. A process as set forth in claim 6, wherein the total residence time of the slurry in the nitration loops is from 6 to 12 minutes.

8. A process as set forth in claim 1, wherein the nitration temperature is up to 43° C.

9. A process as set forth in claim 1, wherein the concentration of cellulose in the slurry is up to 50 g per liter of nitrating liquor.

10. The process according to claim 1 wherein the slurry is injected into said reactor by means of a pump capable of providing a variable flow rate whereby the residence time of the slurry in said reactor may be varied.

11. The process according to claim 1 wherein the rate of injection is not lower than 0.7 m/second.

12. Nitration apparatus for the continuous nitration of cellulose which comprises:
(i) a primary nitration reactor comprising a loop of tubing,
(ii) an injection pump for feeding a slurry of cellulose in nitrating liquor into the loop under pressure,
(iii) a circulation pump which forms part of the loop and which is adapted to produce a flow rate in the loop which is greater than the rate of injection of the slurry into the loop,
wherein an outlet pipe from the primary nitration loop is connected to at least one secondary nitration reactor, arranged in series, each secondary nitration reactor comprising a loop of tubing and a circulation pump which forms part of the loop and which is adapted to produce a flow rate in the loop which is greater than the rate of injection of the slurry into the primary nitration loop, and an outlet pipe for the withdrawal of slurry from the loop.

13. Nitration apparatus as set forth in claim 12, wherein the number of secondary nitration loops is not more than 4.

14. Nitration apparatus according to claim 12, wherein the injection pump and the circulation pump is a centrifugal pump.

15. Nitration apparatus as set forth in claim 14, wherein the centrifugal pumps are equipped with speed variators.

* * * * *